(12) United States Patent
Jha et al.

(10) Patent No.: US 10,719,363 B2
(45) Date of Patent: Jul. 21, 2020

(54) RESOURCE CLAIM OPTIMIZATION FOR CONTAINERS

(71) Applicant: VMWARE, INC., Palo Alto, CA (US)

(72) Inventors: Chandrashekhar Jha, Bangalore (IN); Dattathreya Sathyamurthy, Bangalore (IN); Swarnalatha Pasupuleti, Bangalore (IN); Ritesh Jha, Bangalore (IN); Soumya Panigrahi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 171 days.

(21) Appl. No.: 15/876,244

(22) Filed: Jan. 22, 2018

(65) Prior Publication Data
US 2019/0227847 A1 Jul. 25, 2019

(51) Int. Cl.
*G06F 9/50* (2006.01)
*G06N 20/00* (2019.01)

(52) U.S. Cl.
CPC ........... *G06F 9/5027* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2018/0097744 A1* | 4/2018 | Hu | H04L 47/823 |
| 2018/0349168 A1* | 12/2018 | Ahmed | H04L 41/0816 |

* cited by examiner

*Primary Examiner* — Eric C Wai

(57) ABSTRACT

Techniques for optimizing resource claims for containers is described. In one example, resource utilization data associated with at least one container may be obtained for a period. A set of forecasting models may be trained based on the resource utilization data associated with a portion of the period. Resource utilization of the at least one container may be predicted for a remaining portion of the period using the set of trained forecasting models. The predicted resource utilization may be compared with the obtained resource utilization data for the remaining portion of the period. A forecasting model may be determined from the set of trained forecasting models based on the comparison to optimize resource claims for the at least one container.

20 Claims, 7 Drawing Sheets

RESOURCE CLAIM OPTIMIZATION FOR CONTAINERS

TECHNICAL FIELD

The present disclosure relates to containers or containerized applications and, more particularly, to optimizing resource claims for containers based on resource utilization history.

BACKGROUND

A container or containerized application is an instance of a user-space running an application within an operating system (OS) of a host device (e.g., a server) or a virtual machine being executed by the host device. Containers enable OS-level virtualization in which the OS kernel allows the existence of multiple isolated containers. A container may provide an executable environment with a complete filesystem. The filesystem may contain code, runtime, system tools, system libraries, and so on. That is, execution of a container can be the same regardless of the underlying infrastructure. A "Docker" is one of the popular existing platforms for creating, migrating, managing, and deploying containers.

A container, unlike a virtual machine, does not require or include a separate OS. Rather, the container relies on the kernel's functionality and uses hardware resources (e.g., central processing unit (CPU), memory, I/O, network, and the like) and separate namespaces to isolate the application's view of the OS. When containers are configured for deployment, a 'request' containing minimum requirement for each resource (e.g., CPU, memory, and the like) may be provided to a container orchestrator. The container orchestrator may reserve this minimum capacity and takes care of placing these containers on different nodes (e.g., servers or virtual machines) based on their resource requirement and availability.

Figure 1:
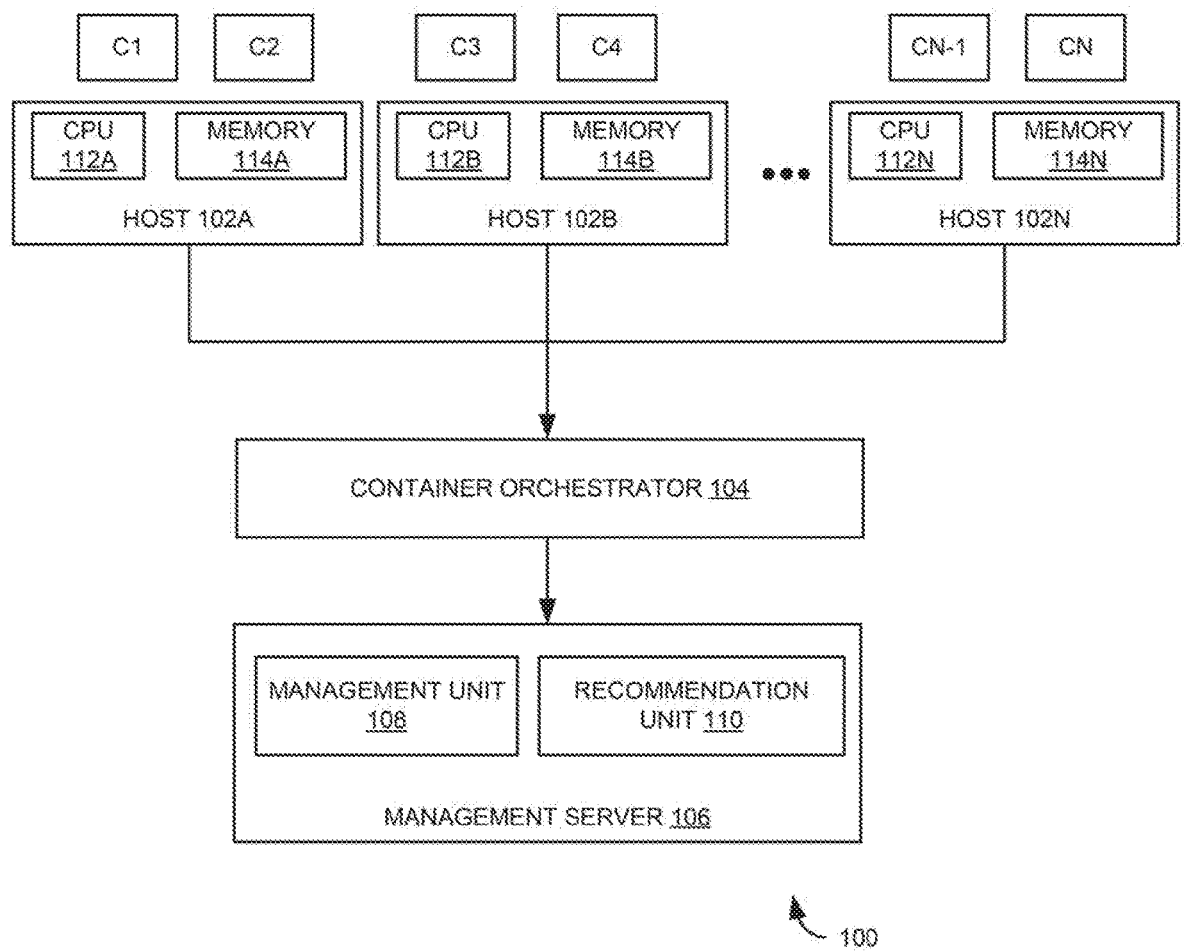
FIG. 1 is a block diagram of an example system for optimizing resource claims for at least one container in a virtual computing environment.

The drawings described herein are for illustration purposes only and are not intended to limit the scope of the present subject matter in any way.

DETAILED DESCRIPTION

As containers (i.e., also referred to as containerized applications) gain popularity, the containers may be extensively used in both private and public clouds. A common myth about container deployments is that the containers are small and stateless that the containers may be optimized for operations. However, in cloud computing environments, the containers claim resources (e.g., central processing unit (CPU), memory, and the like), compete for resources, and die at the lack of resources. Containers may be served using a container orchestrator such as Kubernetes® or Docker Swarm®, which manages the life cycle of the containers. The container orchestrator may handle placement and scale concerns, i.e., the container orchestrator may decide where to best place a container between a swarm of nodes (e.g., virtual machines or physical servers), how to update the container deployments based on a heath check, how many replicas to maintain, and the like.

The container orchestrators may have a set of nodes at their disposal to deploy the requested containers. One of the inputs that helps the container orchestrator decide the placement may be the resource 'request' that the containers make. The request may include a minimum amount of resources the container can be guaranteed during execution. The request may also be used by a resource scheduler to assign pods to nodes. A pod may refer to a group of related containers collocated on a node. So, a node is considered available if the node can satisfy the requests of all the containers in a pod.

When containers are configured for deployment, a 'request' containing minimum requirement for each resource may be provided to the container orchestrator. The container orchestrator may reserve this minimum capacity and takes care of placing these containers on different nodes based on their resource requirement and availability. The requests may be over provisioned on production workloads to keep them 'safe' in order to protect against a resource shortage on a node when resource usage increases. The containers may end up underutilizing the resources that they originally requested for. For example, due to result of high scale test, a container may declare associated request as 70% CPU although the container may use below 30%.

When a new container needs to be deployed, the resource scheduler ensures that, for each resource type, the sum of the resource requests of the scheduled containers may be less than the capacity of the node. Although actual memory or CPU resource usage on nodes may be substantially low, the resource scheduler may refuse to place a pod on a node if the capacity check on the nodes fails. Because of such bloated requests, nodes may get exhausted substantially earlier than what the nodes can handle, and hence new container placements may be rejected.

Embodiments described herein may provide an enhanced computer-based and network-based method, technique, and system for determining recommended resource claims (i.e., optimal resource request values) for the containers based on historical utilization of the resources (e.g., CPU, memory, and the like) by the containers using a machine learning. The recommended resource claims may be used to dynamically readjust the request of containers, thus improving resource utilization which in turn reduces cost by saving significant amount of resources for an enterprise. Examples described herein may also provide elasticity of the resources to the container. i.e., when a container starts consuming more resources, examples described herein may dynamically recommend additional resources for that container.

In one example, resource utilization data associated with at least one container may be obtained for a period. Further, a set of forecasting models may be trained based on the resource utilization data associated with a first portion of the period. Furthermore, resource utilization of the at least one container may be predicted/forecasted for a remaining portion of the period using the set of trained forecasting models. The predicted resource utilization may be compared with the obtained resource utilization data for the remaining portion of the period to determine a forecasting model from the set of trained forecasting models. The determined forecasting model may be used to optimize resource claims for the at least one container.

System Overview and Examples of Operation

FIG. 1 is a block diagram of an example system 100 for optimizing resource claims for at least one container (e.g., containers C1-CN). Examples described herein can be implemented in a cloud computing environment (e.g., virtualized cloud computing environment), which may include one or more computing platforms that support deployment, scaling, and management of container-based cloud applications. One such platform is the vRealize operations (vROPs), which is commercially available from VMware. Examples described herein can be implemented in vROPs product as an optimization module which can help customers to reduce cost of running containers. While vROPs is one example of a cloud deployment and management platform, it should be noted that any computing platform that supports the creation and deployment of containers is within the scope of the present invention.

As shown in FIG. 1, system 100 may include hosts 102A-N executing containers C1-CN. In one example, each host 102A-N may be a physical server or a virtual machine that hosts respective containers C1-CN. The term "containers" may refer to software instances that enable virtualization at an operating system (OS) level. That is, with containerization, the kernel of the OS that manages each host 102A-N can provide multiple isolated user space instances. These instances, referred to as containers, appear as unique servers from the standpoint of an end user that communicates with the containers via a network. However, from the standpoint of the OS that manages hosts 102A-N on which the containers C1-CN execute, the containers C1-CN may be user processes that are scheduled and dispatched by the OS. Example network may include a plurality of networks including one or more of a local area network (LAN), a wide area network (WAN), the Internet, or another network or communication connection. In one example, as depicted in FIG. 1, each host 102A-N may include respective compute, network, and storage resources such as central processing unit (CPU) 112A-N, memory 114A-N, network interface cards (NICs), storage, and the like.

Further, example system 100 may include a container orchestrator 104 which automatically deploys, scales, and manages containers C1-CN in the cloud computing environment. Example container orchestrator may include Kubernetes® or Docker Swarm®, which manages the life cycle of the containers C1-CN. During operation, container orchestrator 104 may store metric data of each of running containers C1-CN including their configured requests, limits and actual utilization.

Further, example system 100 may include a management server 106 communicatively coupled to container orchestrator 104. Management server 106 may refer to a computing device, or computer program (i.e., executing on a computing device), that provides some service to clients, for instance, to manage containers C1-CN. Management server 106 may connect to the cloud deployment platforms either directly or over a network (e.g., over a local-area network, wide-area network, wireless network, or the like).

The management server 106 may include a management unit 108 and a recommendation unit 110. In other examples, management unit 108 and recommendation unit 110 can be implemented on different servers. One skilled in the art can appreciate that management unit 108 and recommendation unit 110 can also be provided in a VM or virtual application that can run on any host computing system and can be provided to a user through a graphical user interface as a part of management software.

For example, management unit 108 and recommendation unit 110 may each be any combination of hardware and programming to implement the functionalities described herein. In some implementations, the programming may be processor executable instructions stored on a non-transitory machine-readable storage medium, and the hardware may include at least one processing resource to retrieve and/or execute those instructions. Example processing resources include a microcontroller, a microprocessor, central processing unit core(s), an application-specific integrated circuit (ASIC), a field programmable gate array (FPGA), etc. Example non-transitory machine-readable medium include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, management unit 108 and recommendation unit 110 may each include electronic circuitry or logic for implementing functionality described herein. An example operation to optimize resource claims for containers C1-CN is explained in FIG. 2A.

Figure 2A:
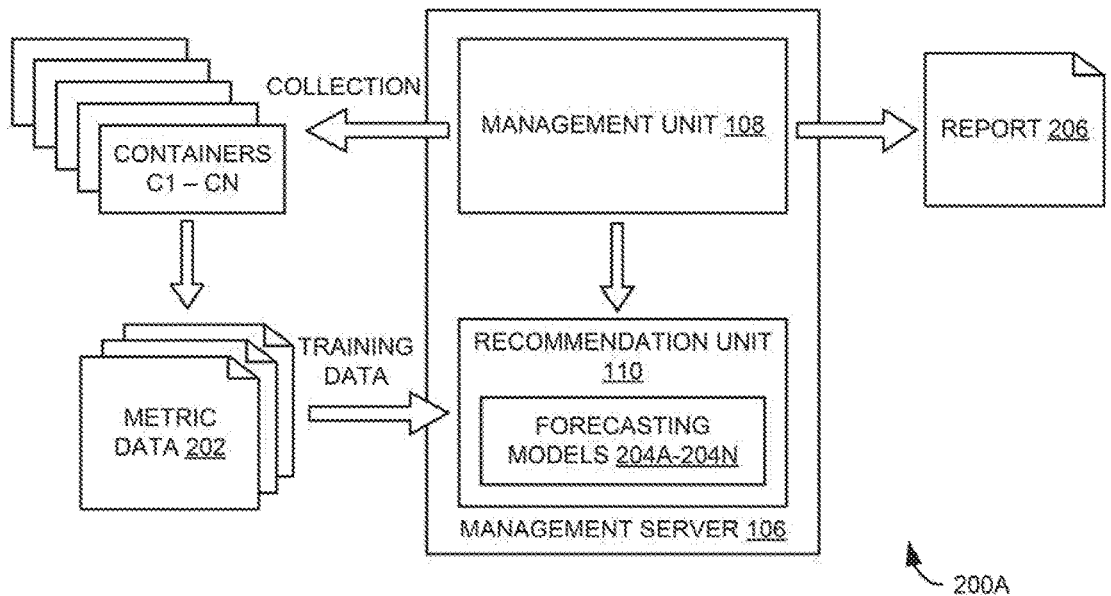
FIG. 2A is a block diagram of an example management server for optimizing resource claims for the at least one container.

FIG. 2A is an example block diagram 200A of example management server 106 for optimizing resource claims for containers C1-CN. During operation, management unit 108 may obtain metric data 202 including resource utilization data associated with containers C1-CN for a period. Further, management unit 108 may input metric data 202 to recommendation unit 110 to train the set of models so that recommendation unit 110 can predict the future resource utilization. Example metric data 202 may include resource configuration requests, resource limits, and the actual resource utilization data associated with containers C1-CN. In one example, management unit 108 may obtain metric data 202 associated with containers C1-CN from a container orchestrator (e.g., orchestrator 104 as shown in FIG. 1) which automatically deploys, scales, and manages containers C1-CN.

Recommendation unit 110 may train a set of forecasting models 204A-N based on the resource utilization data associated with a first portion of the period. For example, the forecasting models may be designed in a R-programming language and learns the utilization patterns from the resource utilization data associated with the first portion of the period (i.e., a training data set). Example forecasting models may include Auto Regressive Integrated Moving Average (ARIMA)-based and artificial neural network-based models to forecast the CPU and memory utilizations.

Further, recommendation unit 110 may predict resource utilization of containers C1-CN for a remaining portion of the period (i.e., a validation data set) using the set of trained forecasting models 204A-N. Furthermore, recommendation unit 110 may determine a forecasting model from the set of trained forecasting models 204A-N based on the predicted resource utilization of each of the set of trained forecasting models 204A-N for the remaining period. In one example, recommendation unit 110 may compare the predicted resource utilization with the obtained resource utilization data for the remaining period and determine the forecasting model from the set of trained forecasting models 204A-N based on the comparison to optimize resource claims for containers C1-CN. An example for determining the forecasting model is explained in FIG. 2B.

Further, recommendation unit 110 may forecast the resource utilization of containers C1-CN for an upcoming period using the determined forecasting model. Recommendation unit 110 may send the forecasted values of resource utilizations to management unit 108. Further, management unit 108 may optimize resource claims for each of containers C1-CN as follows:

Management unit 108 may determine a recommended resource claim for each container C1-CN using the forecasted resource utilization for the upcoming period. In one example, management unit 108 may calculate the recommended 'request' value for each of the resources (e.g., CPU and memory) associated with each container C1-CN.

Management unit 108 may generate a report 206 including the recommended resource claim for each container C1-CN. In one example, report 206 may give the user a consolidated view of the recommended 'request' values for each container C1-CN.

Management unit 108 may dynamically adjust resource allocations associated with each container C1-CN for the upcoming period in accordance with the recommended resource claim. In other examples, management unit 108 may enable users to adjust resource allocations associated with each container C1-CN in accordance with the recommended resource claims.

In other examples. management unit 108 may add a threshold percentage or a threshold margin to the recommended resource claim, and generate the report including the recommended resource claim for the container upon adding the threshold percentage.

Figure 2B:
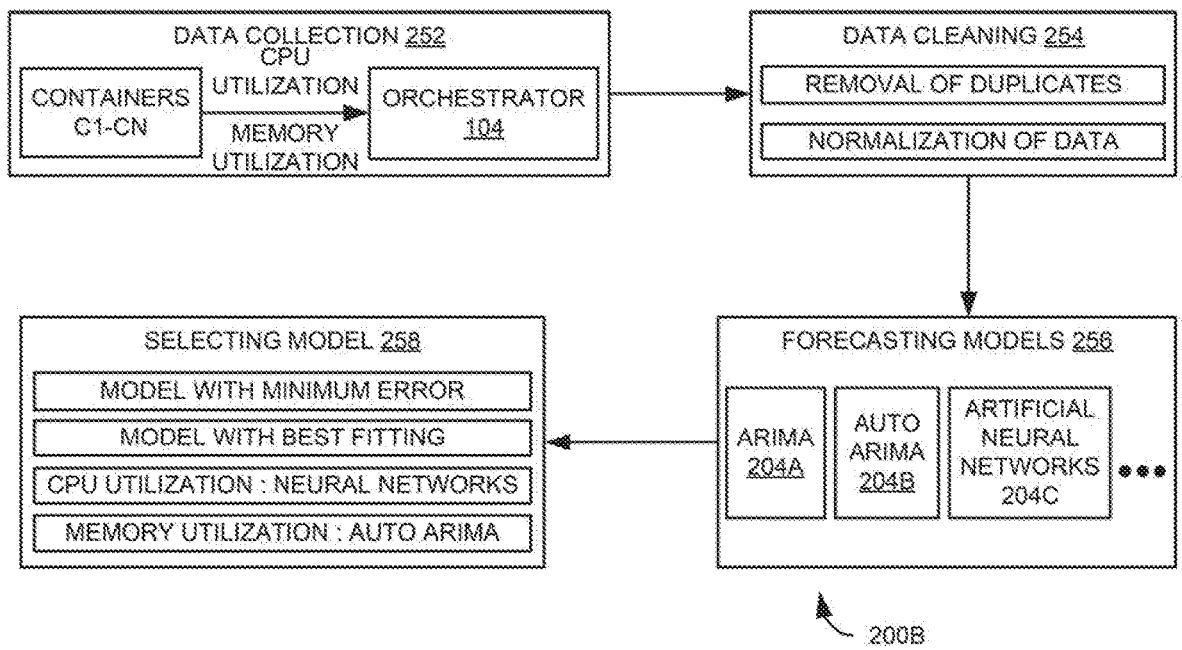
FIG. 2B is an example schematic diagram, depicting determining a forecasting model from a set of trained forecasting models for forecasting CPU utilization and/or memory utilization.

FIG. 2B is an example schematic diagram 200B, depicting determining a forecasting model from a set of trained forecasting models for forecasting CPU utilization and/or memory utilization. At 252, the CPU and memory utilization data of containers C1-CN may be collected for a given period of time.

At 254, the CPU and memory utilization data may be cleaned for missing values, outliers, duplicate entries, and the like. In this example, the duplicate entries may be removed from the CPU and memory utilization data and/or the CPU and memory utilization data may be normalized. At 256, the CPU and memory utilization data may be divided into a training data set (e.g., first 70%) and a validation data set (e.g., last 30%). In one example, the forecasting models such as ARIMA 204A, auto ARIMA 204B, and artificial neural networks 204C may be trained using the training data set. Further at 256, the trained forecasting models may be run to predict the CPU and memory utilization for the validation period (i.e., last 30%). Furthermore at 256, the predicted CPU and memory utilization may be compared with the validation data set.

At 258, a forecasting model having high accuracy for forecasting the CPU and memory utilizations may be selected based on the comparison. For example, the forecasting model with minimum error and with good fit may be selected from the set of forecasting models. In addition, the CPU and memory utilizations may be forecasted for a given upcoming period (e.g., 1 week, 2 weeks, and the like based on container requirements). Then a threshold margin (e.g., 10% or any other value) may be added to the CPU and memory utilizations to accommodate the fluctuations for the upcoming period. Then, a report may be created for the recommended CPU and memory claims for the containers, which may be used by a script/program (e.g., management unit 108) to update the resource claims for each of containers C1-CN. In the example shown in FIG. 2B, artificial neural networks may have high accuracy among the set of forecasting models for forecasting the CPU utilization and Auto ARIMA may have the high accuracy among the forecasting models for forecasting the memory utilization.

Figure 3:
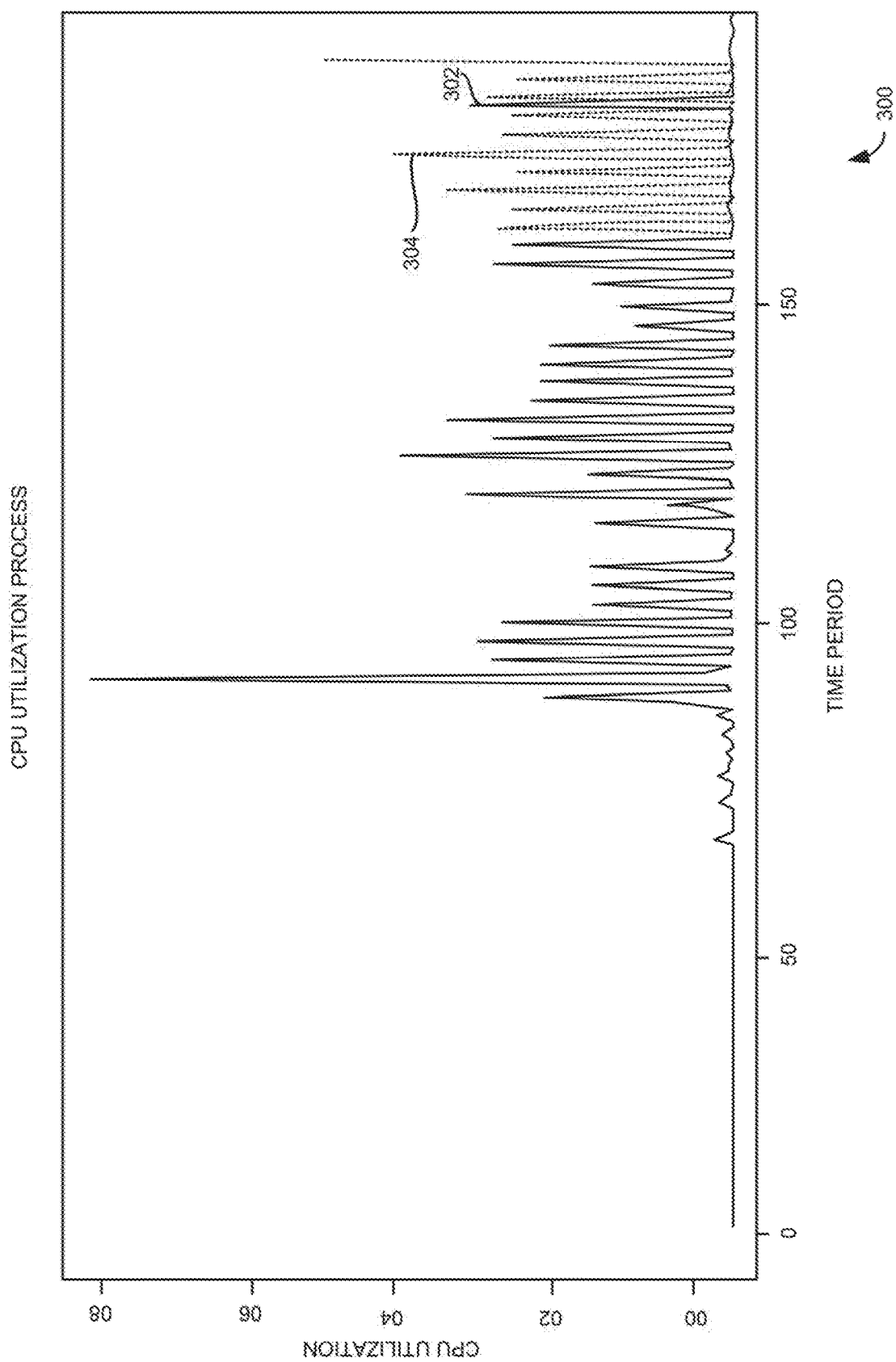
FIG. 3 is an example graph, depicting an actual CPU utilization data and a forecasted CPU utilization data for the at least one container.

FIG. 3 is an example graph 300, depicting an actual CPU utilization data 302 and a forecasted CPU utilization data 304 for the at least one container for the remaining/validation period. Since the CPU utilizations are non-linear in nature, the forecasting model "artificial neural network" may have high accuracy amongst the set of forecasting models for forecasting the CPU utilization.

Figure 4:
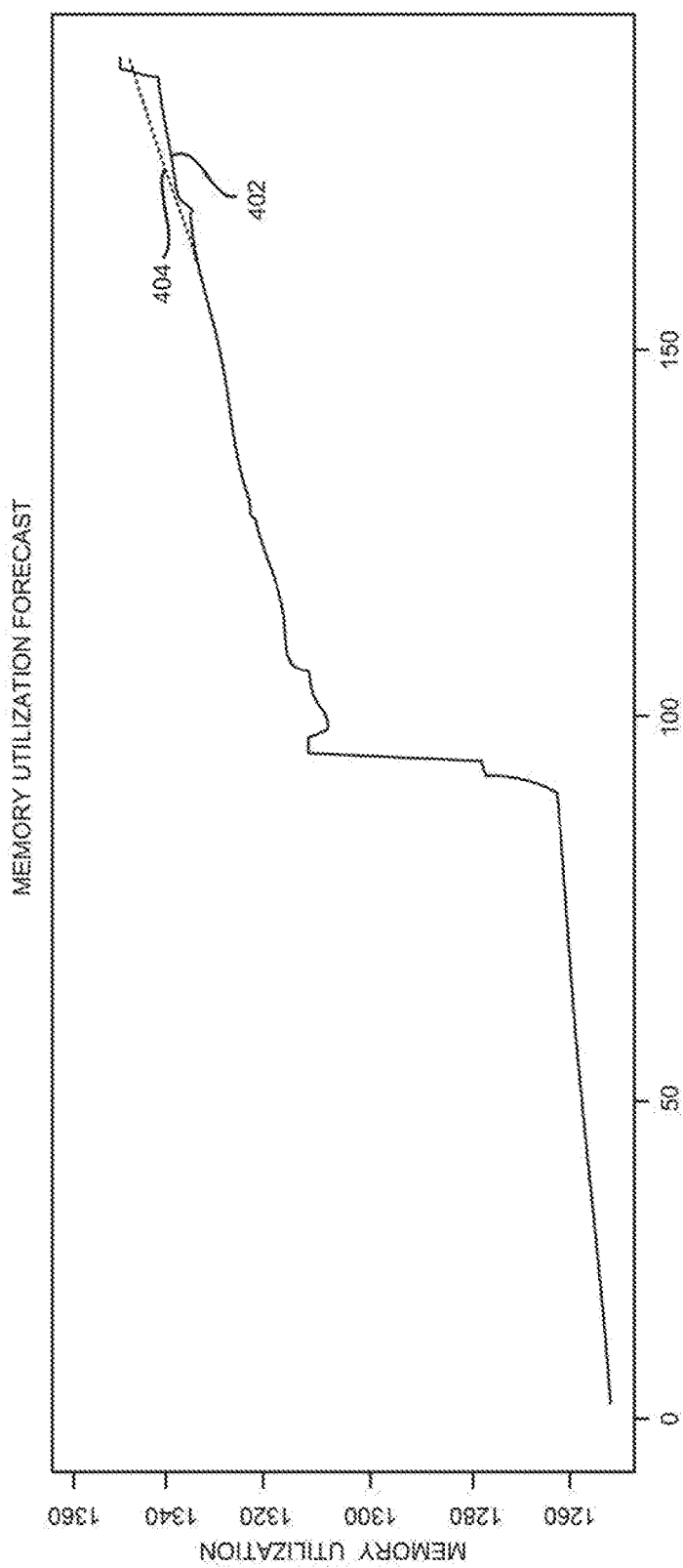
FIG. 4 is an example graph, depicting an actual memory utilization data and a forecasted memory utilization data for the at least one container.

FIG. 4 is an example graph 400, depicting an actual memory utilization data 402 and a forecasted memory utilization data 404 for the at least one container for the remaining/validation period. In this example, the forecasting model "Auto ARIMA" may have the high accuracy among the forecasting models for predicting the memory utilization. The forecasting model "Auto ARIMA" may have the high accuracy because the memory utilizations are linear in nature and auto ARIMA works based on linear regression on a moving average.

Figure 5:
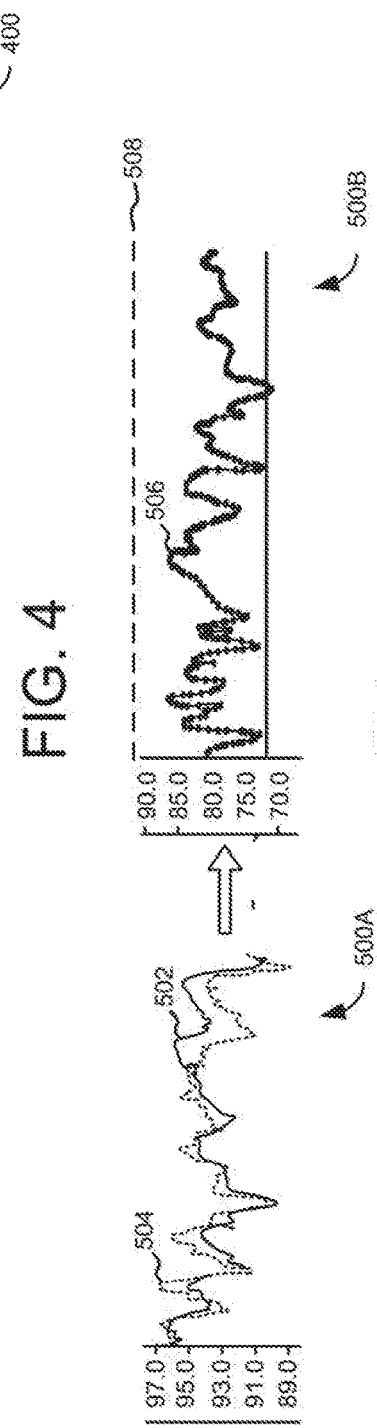
FIG. 5 illustrates example graphs, depicting recommended resource claims for the at least one container based on the actual and forecasted resource utilization data.

FIG. 5 illustrates an example graphs 500A and 500B, depicting recommended resource claims for the at least one container based on the actual and forecasted CPU and/or memory utilization data. In one example, graph 500A may depict actual utilization data (e.g., plot 502) and forecasted utilization data (e.g., plot 504) during the validation period. Graph 500B may depict forecasted utilization data (e.g., plot 506) for the upcoming period. In addition, graph 500B may depict recommended resource claim 508 corresponding to each container (e.g., containers C1-CN as shown in FIGS. 1, 2A, and 2B) by applying a threshold margin to the forecasted utilization data to to reduce a risk of increased load or instantaneous spikes in the resource utilization for the upcoming period.

For example, consider 376 containers may be claiming about 69 vCPU and 227 GB of RAM in a cloud computing environment. By applying the resource claim optimization described herein, the 376 containers can be run by claiming about 27 vCPU and 140 GB of RAM which can result in about 40% of resource saving and hence saving cost.

Examples described herein may be implemented in a cloud computing environment where a set of resources may be allocated to one or more clients. Examples described herein can be implemented in vRealize Automation®, vRealize Operations, vRealize Business, and/or the like that are offered by VMware. Examples described herein can be used in cloud automation management tools, for instance, to scale-in or scale-out the number of instances of containers.

Also, examples described herein may apply to other examples of contexts, such as virtual machines having a corresponding guest OS.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 6A:
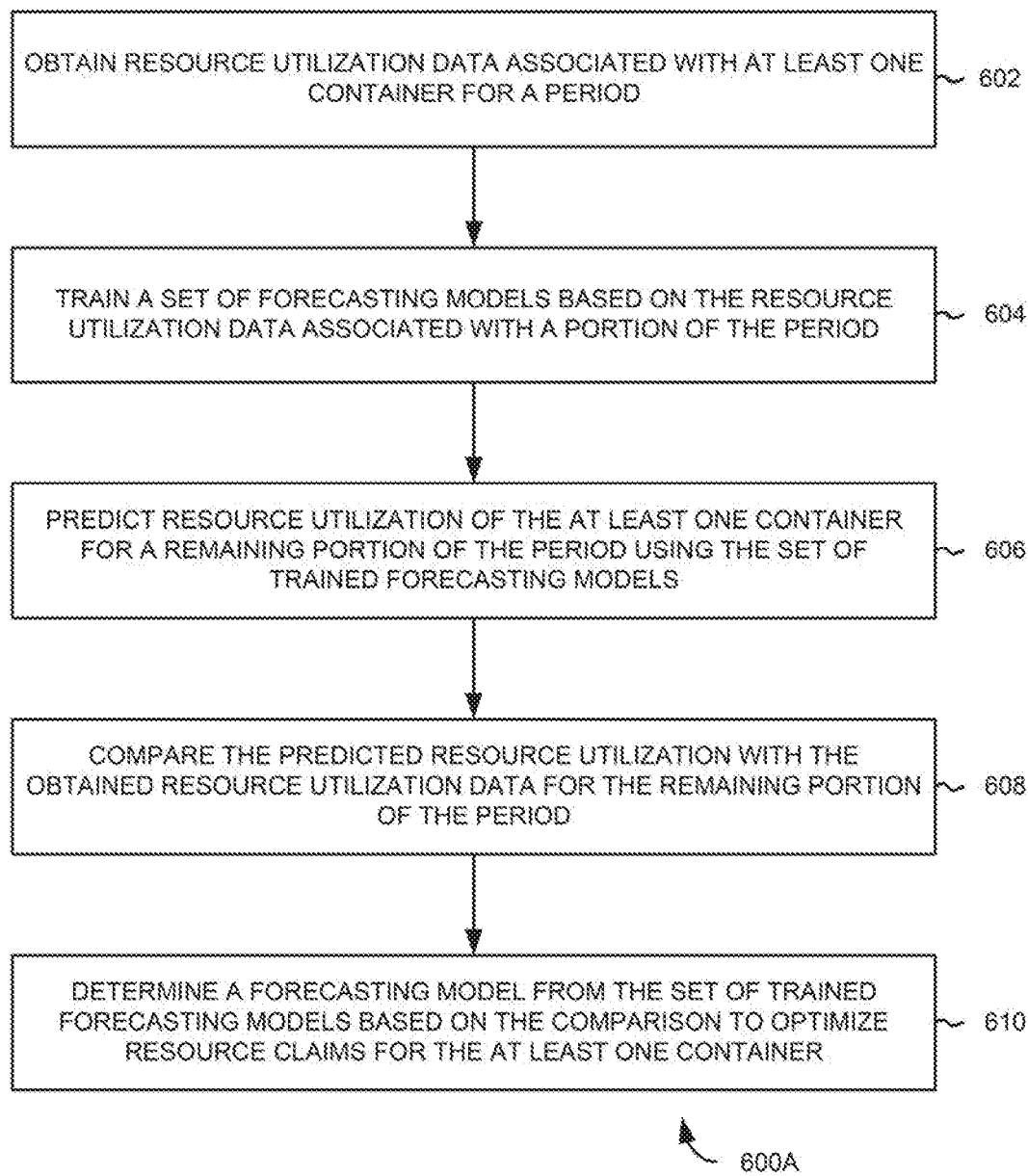
FIG. 6A illustrates a flow diagram of an example method to determine a forecasting model for forecasting CPU utilization and/or memory utilization for at least one container.
Figure 6B:
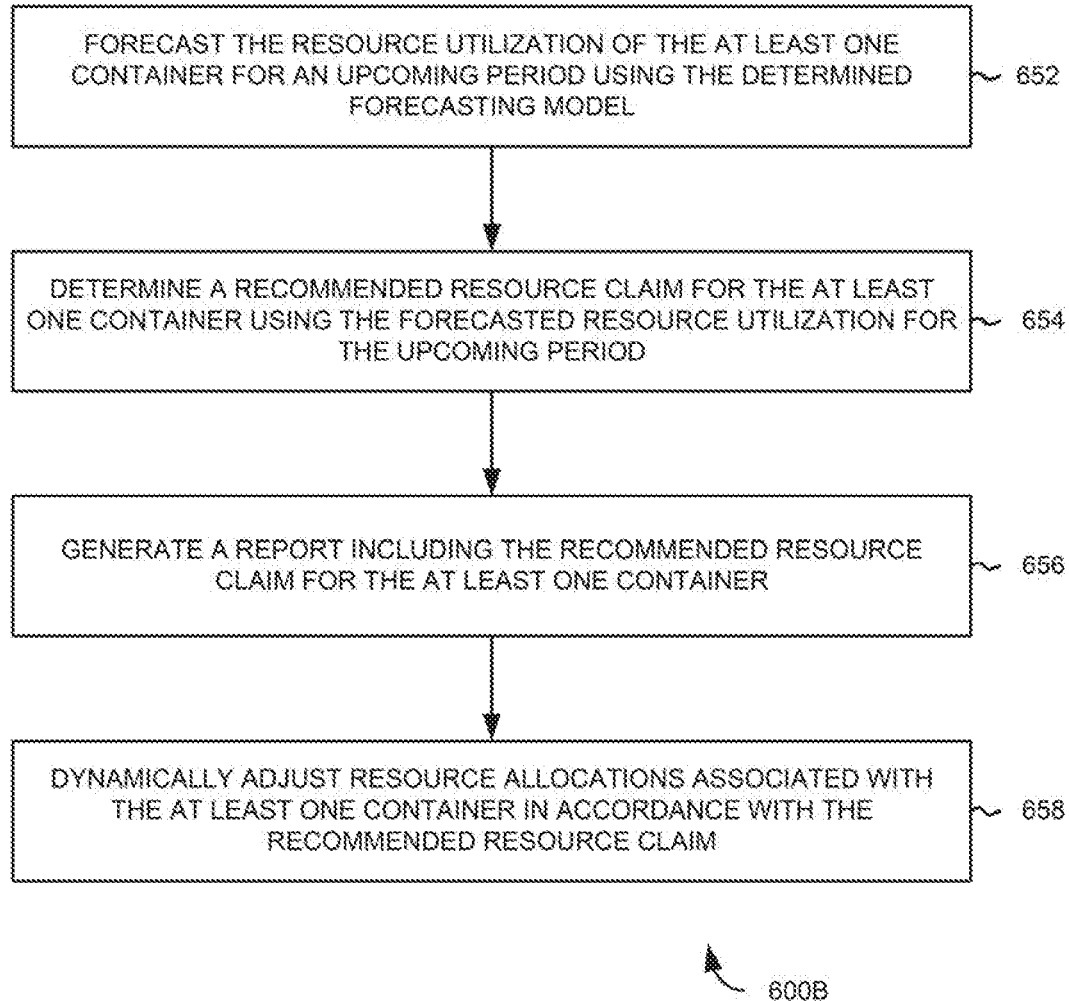
FIG. 6B illustrates a flow diagram of an example method to optimize resource claims for the at least one container using the forecasted CPU utilization and/or memory utilization.

FIGS. 6A and 6B illustrate flow diagrams of example methods to optimize resource claims for at least one container. It should be understood that the process depicted in FIG. 6 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Particularly, FIG. 6A illustrates a flow diagram of an example method 600A to determine a forecasting model for forecasting CPU utilization and/or memory utilization for at least one container. A container may be a data computer node that runs on top of a host OS without the need for a hypervisor or separate OS. At 602, resource utilization data (i.e., historical resource utilization data) associated with at least one container may be obtained for a period (i.e., given period). In one example, the resource utilization data for the given period may be divided in to a portion of the period (e.g., first 70%) and a remaining portion of the period (e.g., last 30%).

At 604, a set of forecasting models may be trained based on the resource utilization data associated with the portion of the period. In one example, prior to training the set of forecasting models, the data may be cleaned to identify any missing values, outliers, duplicate entries, and the like. For example, the set of forecasting models may include any combination of Auto Regressive Integrated Moving Average (ARIMA) based models and/or artificial neural network based models.

At 606, resource utilization of the at least one container may be predicted for the remaining portion of the period using the set of trained forecasting models. At 608, the predicted resource utilization may be compared with the obtained resource utilization data for the remaining portion of the period. At 610, a forecasting model may be determined from the set of trained forecasting models based on the comparison to optimize resource claims for the at least one container. In one example, the forecasting model having high accuracy amongst the set of forecasting models may be determined/selected for forecasting the CPU utilization and/or memory utilization based on the comparison.

FIG. 6B illustrates a flow diagram of an example method 600B to optimize resource claims for the at least one container using the forecasted CPU utilization and/or memory utilization. At 652, the resource utilization of the at least one container may be forecasted for an upcoming period using the determined forecasting model. At 654, a recommended resource claim for the at least one container may be determined using the forecasted resource utilization for the upcoming period.

At 656, a report including the recommended resource claim for the at least one container may be generated. In one example, a threshold percentage may be added/applied to the recommended resource claim for accommodating any fluctuations and the report including the recommended resource claim for the at least one container may be generated upon adding the threshold percentage. At 658, resource allocations/resource claims associated with the at least one container may be dynamically adjusted for the upcoming period in accordance with the recommended resource claim. The method for calculating optimal resource claims for the containers is explained in more detail with reference to FIGS. 1-5.

Figure 7:
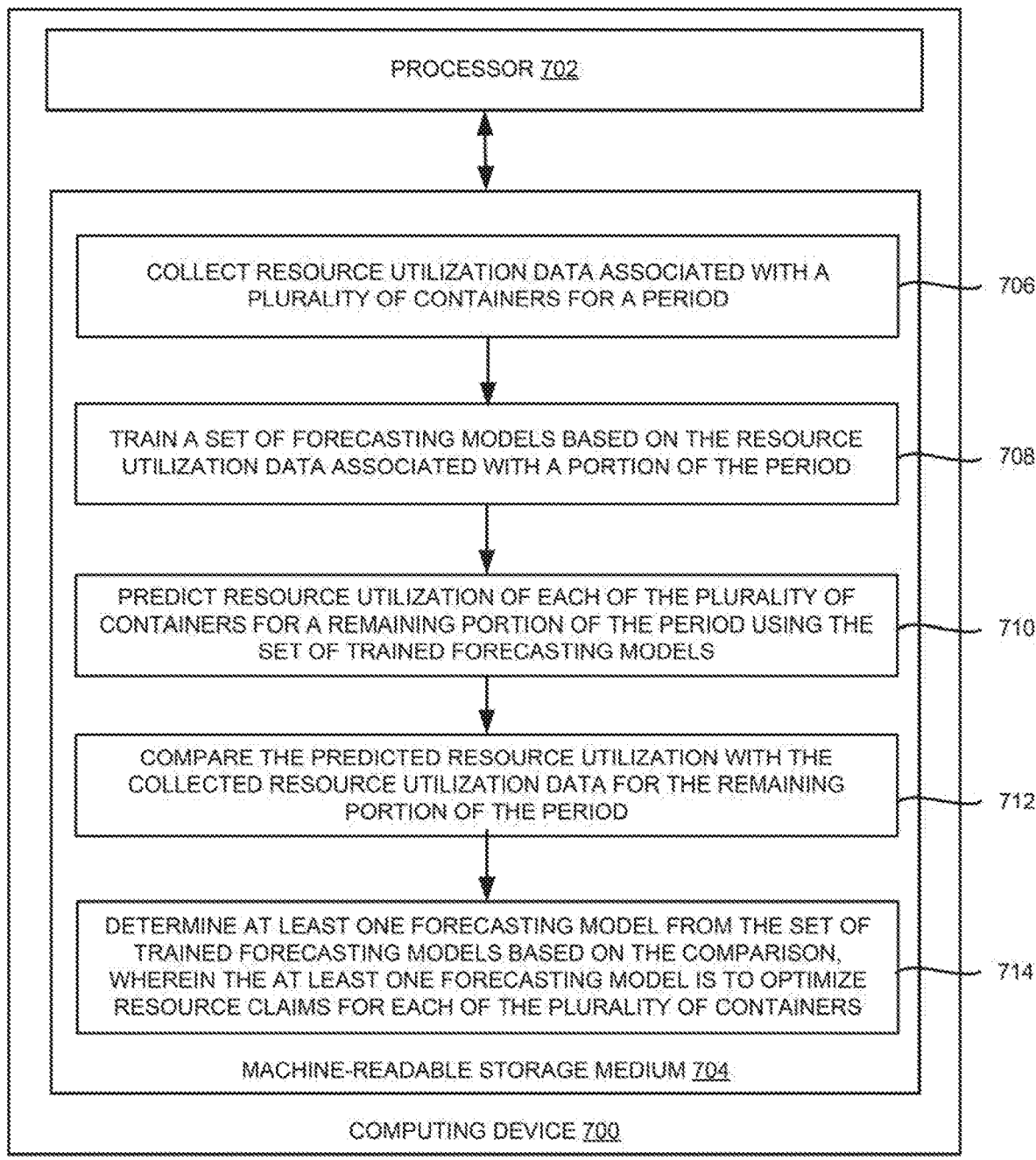
FIG. 7 is a block diagram of an example computing device including non-transitory computer-readable storage medium storing instructions to optimize resource claims for each of a plurality of containers.

FIG. 7 is a block diagram of an example computing device 700 including non-transitory computer-readable storage medium storing instructions to dynamically generate UI components based on hierarchical component factories. Computing device 700 (e.g., client 104 of FIG. 1) includes a processor 702 and a machine-readable storage medium 704 communicatively coupled through a system bus. Processor 702 may be any type of central processing unit (CPU), microprocessor, or processing logic that interprets and executes machine-readable instructions stored in machine-readable storage medium 704. Machine-readable storage medium 704 may be a RAM or another type of dynamic storage device that may store information and machine-readable instructions that may be executed by processor 702. For example, machine-readable storage medium 704 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 704 may be a non-transitory machine-readable medium. In an example, machine-readable storage medium 704 may be remote but accessible to computing device 700.

Machine-readable storage medium 704 may store instructions 706-714 that can be executed by processor 702. Instructions 706 may be executed by processor 702 to collect resource utilization data associated with a plurality of containers for a period. Example resource utilization data may include at least one of CPU utilization data and memory utilization data.

Instructions 708 may be executed by processor 702 to train a set of forecasting models based on the resource utilization data associated with a portion of the period. Instructions 710 may be executed by processor 702 to predict the resource utilization of each of the plurality of containers for a remaining portion of the period using the set of trained forecasting models. Instructions 712 may be executed by processor 702 to compare the predicted resource utilization with the collected resource utilization data for the remaining portion of the period.

Instructions 714 may be executed by processor 702 to determine at least one forecasting model from the set of trained forecasting models based on the comparison. In one example, the at least one forecasting model having high accuracy amongst the set of forecasting models may be determined for forecasting the CPU and memory utilizations based on the comparison. For example, a first forecasting model may be determined from the set of trained forecasting models for forecasting the CPU utilization and a second forecasting model may be determined from the set of trained forecasting models for forecasting the memory utilization.

In one example, the at least one forecasting model is to optimize resource claims for each of the plurality of containers. Further, non-transitory machine-readable storage medium 704 may further include instructions that, when executed by the processor, cause the processor to forecast the resource utilization for each of the plurality of containers for an upcoming period using the at least one determined forecasting model, determine a recommended resource claim for each of the plurality of containers using the forecasted resource utilization for the upcoming period, and generate a report including the recommended resource claim for each of the plurality of containers. Non-transitory machine-readable storage medium 704 may further include instructions that, when executed by the processor, cause the processor to dynamically adjust resource allocations associated with each of the plurality of containers for the upcoming period in accordance with the recommended resource claim for each container.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
obtaining resource utilization data associated with at least one container for a period;
training a set of forecasting models based on the resource utilization data associated with a portion of the period;
predicting resource utilization of the at least one container for a remaining portion of the period using the set of trained forecasting models;
comparing the predicted resource utilization with the obtained resource utilization data for the remaining portion of the period; and
determining a forecasting model from the set of trained forecasting models based on the comparison to optimize resource claims for the at least one container.

2. The method of claim 1, further comprising:
forecasting the resource utilization of the at least one container for an upcoming period using the determined forecasting model;
determining a recommended resource claim for the at least one container using the forecasted resource utilization for the upcoming period; and
generating a report including the recommended resource claim for the at least one container.

3. The method of claim 2, further comprising:
dynamically adjusting resource allocations associated with the at least one container for the upcoming period in accordance with the recommended resource claim.

4. The method of claim 2, wherein generating the report including the recommended resource claim for the at least one container comprises:
adding a threshold percentage to the recommended resource claim; and
generating the report including the recommended resource claim for the at least one container upon adding the threshold percentage.

5. The method of claim 1, wherein prior to training the set of forecasting models, cleaning the data to identify missing values, outliers, and duplicate entries.

6. The method of claim 1, wherein determining the forecasting model from the set of forecasting models based on the comparison comprises:
determining the forecasting model having high accuracy from the set of forecasting models for forecasting central processing unit (CPU) utilization and/or memory utilization based on the comparison.

7. The method of claim 1, wherein the set of forecasting models comprises any combination of Auto Regressive Integrated Moving Average (ARIMA) based models and artificial neural network based models.

8. A system comprising:
a management unit to obtain metric data including resource utilization data associated with at least one container for a period; and
a recommendation unit communicatively coupled to the management unit to:

train a set of forecasting models based on the resource utilization data associated with a first portion of the period;
predict resource utilization of the at least one container for a remaining portion of the period using the set of trained forecasting models;
determine a forecasting model from the set of trained forecasting models based on the predicted resource utilization of each of the set of trained forecasting models; and
forecast the resource utilization of the at least one container for an upcoming period using the determined forecasting model.

9. The system of claim 8, wherein the management unit is to:
determine a recommended resource claim for the at least one container using the forecasted resource utilization for the upcoming period; and
generate a report including the recommended resource claim for the at least one container.

10. The system of claim 9, wherein the management unit is to:
dynamically adjust resource allocations associated with the at least one container for the upcoming period in accordance with the recommended resource claim.

11. The system of claim 8, wherein the recommendation unit is to:
compare the predicted resource utilization with the obtained resource utilization data for the remaining portion of the period; and
determine the forecasting model from the set of trained forecasting models based on the comparison to optimize resource claims for the at least one container.

12. The system of claim 8, wherein the metric data comprises resource configuration requests, resource limits, and the resource utilization data associated with the at least one container.

13. The system of claim 8, wherein the management unit is to obtain the metric data associated with the at least one container from a container orchestrator, which automatically deploys, scales, and manages the at least one container.

14. The system of claim 8, wherein the management unit is to:
add a threshold percentage to the recommended resource claim; and
generate the report including the recommended resource claim for the at least one container upon adding the threshold percentage.

15. A non-transitory machine-readable storage medium encoded with instructions that, when executed by a processor, cause the processor to:
collect resource utilization data associated with a plurality of containers for a period;
train a set of forecasting models based on the resource utilization data associated with a portion of the period;
predict resource utilization of each of the plurality of containers for a remaining portion of the period using the set of trained forecasting models;
compare the predicted resource utilization with the collected resource utilization data for the remaining portion of the period; and
determine at least one forecasting model from the set of trained forecasting models based on the comparison, wherein the at least one forecasting model is to optimize resource claims for each of the plurality of containers.

16. The non-transitory machine-readable storage medium of claim 15, further comprising instructions that, when executed by the processor, cause the processor to:
forecast the resource utilization for each of the plurality of containers for an upcoming period using the at least one determined forecasting model;
determine a recommended resource claim for each of the plurality of containers using the forecasted resource utilization for the upcoming period; and
generate a report including the recommended resource claim for each of the plurality of containers.

17. The non-transitory machine-readable storage medium of claim 16, further comprising instructions that, when executed by the processor, cause the processor to:
dynamically adjust resource allocations associated with each of the plurality of containers for the upcoming period in accordance with the recommended resource claim for each of the containers.

18. The non-transitory machine-readable storage medium of claim 15, the at least one forecasting model having high accuracy is determined from the set of forecasting models for forecasting the central processing unit (CPU) and memory utilizations based on the comparison.

19. The non-transitory machine-readable storage medium of claim 15, wherein the resource utilization data comprises at least one of CPU utilization data and memory utilization data.

20. The non-transitory machine-readable storage medium of claim 15, wherein determining the at least one forecasting model from the set of trained forecasting models comprises:
determining a first forecasting model from the set of trained forecasting models for forecasting CPU utilization; and
determining a second forecasting model from the set of trained forecasting models for forecasting memory utilization.

* * * * *